(12) United States Patent
Sim et al.

(10) Patent No.: US 11,830,448 B2
(45) Date of Patent: Nov. 28, 2023

(54) METHODS FOR DRIVING ELECTRO-OPTIC DISPLAYS

(71) Applicant: E INK CORPORATION, Billerica, MA (US)

(72) Inventors: Teck Ping Sim, Acton, MA (US); Chih-Hsiang Ho, Andover, MA (US); Karl Raymond Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 18/049,871

(22) Filed: Oct. 26, 2022

(65) Prior Publication Data

US 2023/0139743 A1 May 4, 2023

Related U.S. Application Data

(60) Provisional application No. 63/275,515, filed on Nov. 4, 2021.

(51) Int. Cl.
*G09G 3/34* (2006.01)
*G09G 3/20* (2006.01)
(Continued)

(52) U.S. Cl.
CPC .......... *G09G 3/344* (2013.01); *G09G 3/2096* (2013.01); *G02F 1/167* (2013.01); *G02F 1/1685* (2019.01);
(Continued)

(58) Field of Classification Search
CPC .......... G09G 3/344; G09G 2310/0251; G09G 2320/0257; G09G 3/2096
See application file for complete search history.

(56) References Cited

U.S. PATENT DOCUMENTS 4,418,346 A 11/1983 Batchelder
5,760,761 A 6/1998 Sheridon
(Continued)

FOREIGN PATENT DOCUMENTS

WO 2001017041 A1 3/2001

OTHER PUBLICATIONS

Korean Intellectual Property Office, "International Search Report and Written Opinion", PCT/US2022/048513, dated Mar. 8, 2023. Mar. 8, 2023.

(Continued)

*Primary Examiner* — Xuemei Zheng
(74) *Attorney, Agent, or Firm* — Jason P. Colangelo

(57) ABSTRACT

The invention provides methods and related apparatuses for driving an electro-optic display having an electrophoretic display medium electrically coupled between a common electrode and a display pixel associated with a display pixel electrode and an n-type transistor electrically coupled to a display controller circuit capable of applying waveforms comprising frames to the display pixel by applying voltages to the common electrode and the display pixel electrode via the n-type transistor. The method includes applying one or more waveforms to the display pixel to drive the electrophoretic display medium in proximity to the display pixel to a first optical state, and discharging a remnant voltage from the electrophoretic display medium utilizing a leakage conduction effect of the n-type transistor. The method can also include maintaining the display pixel in the first optical state for a hold period comprising one or more frames, and placing the display pixel in a floating state.

26 Claims, 6 Drawing Sheets

(51) Int. Cl.
  *G02F 1/167*   (2019.01)
  *G02F 1/1685*  (2019.01)
(52) U.S. Cl.
  CPC . *G09G 2300/0426* (2013.01); *G09G 2310/06* (2013.01); *G09G 2310/08* (2013.01); *G09G 2330/021* (2013.01)

(56) References Cited

U.S. PATENT DOCUMENTS

| | | |
|---|---|---|
| 5,777,782 A | 7/1998 | Sheridon |
| 5,808,783 A | 9/1998 | Crowley |
| 5,872,552 A | 2/1999 | Gordon, II et al. |
| 5,930,026 A | 7/1999 | Jacobson |
| 6,054,071 A | 4/2000 | Mikkelsen, Jr. |
| 6,055,091 A | 4/2000 | Sheridon |
| 6,097,531 A | 8/2000 | Sheridon |
| 6,128,124 A | 10/2000 | Silverman |
| 6,130,774 A | 10/2000 | Albert et al. |
| 6,137,467 A | 10/2000 | Sheridon |
| 6,144,361 A | 11/2000 | Gordon, II |
| 6,147,791 A | 11/2000 | Sheridon |
| 6,184,856 B1 | 2/2001 | Gordon, II |
| 6,225,971 B1 | 5/2001 | Gordon, II |
| 6,241,921 B1 | 6/2001 | Jacobson et al. |
| 6,271,823 B1 | 8/2001 | Gordon, II |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,531,997 B1 | 3/2003 | Gates et al. |
| 6,672,921 B1 | 1/2004 | Liang et al. |
| 6,753,999 B2 | 6/2004 | Zehner et al. |
| 6,788,449 B2 | 9/2004 | Liang et al. |
| 6,825,970 B2 | 11/2004 | Goenaga et al. |
| 6,866,760 B2 | 3/2005 | Paolini, Jr. et al. |
| 6,900,851 B2 | 5/2005 | Morrison et al. |
| 6,922,276 B2 | 7/2005 | Zhang et al. |
| 6,982,178 B2 | 1/2006 | LeCain et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,144,942 B2 | 12/2006 | Zang et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,236,291 B2 | 6/2007 | Kaga et al. |
| 7,259,744 B2 | 8/2007 | Arango et al. |
| 7,312,784 B2 | 12/2007 | Baucom et al. |
| 7,321,459 B2 | 1/2008 | Masuda |
| 7,327,511 B2 | 2/2008 | Whitesides et al. |
| 7,408,699 B2 | 8/2008 | Wang et al. |
| 7,411,719 B2 | 8/2008 | Paolini, Jr. et al. |
| 7,420,549 B2 | 9/2008 | Jacobson et al. |
| 7,453,445 B2 | 11/2008 | Amundson |
| 7,492,339 B2 | 2/2009 | Amundson |
| 7,528,822 B2 | 5/2009 | Amundson et al. |
| 7,535,624 B2 | 5/2009 | Amundson et al. |
| 7,583,251 B2 | 9/2009 | Arango et al. |
| 7,602,374 B2 | 10/2009 | Zehner et al. |
| 7,612,760 B2 | 11/2009 | Kawai |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,715,088 B2 | 5/2010 | Liang et al. |
| 7,787,169 B2 | 8/2010 | Abramson et al. |
| 7,839,564 B2 | 11/2010 | Whitesides et al. |
| 7,859,742 B1 | 12/2010 | Chiu et al. |
| 7,952,557 B2 | 5/2011 | Amundson |
| 7,956,841 B2 | 6/2011 | Albert et al. |
| 7,982,479 B2 | 7/2011 | Wang et al. |
| 7,999,787 B2 | 8/2011 | Amundson et al. |
| 8,009,348 B2 | 8/2011 | Zehner et al. |
| 8,077,141 B2 | 12/2011 | Duthaler et al. |
| 8,125,501 B2 | 2/2012 | Amundson et al. |
| 8,139,050 B2 | 3/2012 | Jacobson et al. |
| 8,174,490 B2 | 5/2012 | Whitesides et al. |
| 8,243,013 B1 | 8/2012 | Sprague et al. |
| 8,274,472 B1 | 9/2012 | Wang et al. |
| 8,289,250 B2 | 10/2012 | Zehner et al. |
| 8,300,006 B2 | 10/2012 | Zhou et al. |
| 8,314,784 B2 | 11/2012 | Ohkami et al. |
| 8,373,649 B2 | 2/2013 | Low et al. |
| 8,384,658 B2 | 2/2013 | Albert et al. |
| 8,456,414 B2 | 6/2013 | Lin et al. |
| 8,462,102 B2 | 6/2013 | Wong et al. |
| 8,514,168 B2 | 8/2013 | Chung et al. |
| 8,537,105 B2 | 9/2013 | Chiu et al. |
| 8,558,783 B2 | 10/2013 | Wilcox et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,605,032 B2 | 12/2013 | Liu et al. |
| 8,665,206 B2 | 3/2014 | Lin et al. |
| 8,681,191 B2 | 3/2014 | Yang et al. |
| 8,810,525 B2 | 8/2014 | Sprague |
| 8,928,562 B2 | 1/2015 | Gates et al. |
| 8,928,575 B2 | 1/2015 | Moriya et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,082,352 B2 | 7/2015 | Cheng et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,279,906 B2 | 3/2016 | Kang |
| 9,299,294 B2 | 3/2016 | Lin et al. |
| 9,390,066 B2 | 7/2016 | Smith |
| 9,390,661 B2 | 7/2016 | Chiu et al. |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,743 B2 | 12/2016 | Sjodin et al. |
| 9,514,667 B2 | 12/2016 | Lin |
| 9,612,502 B2 | 4/2017 | Danner et al. |
| 9,620,048 B2 | 4/2017 | Sim et al. |
| 9,672,766 B2 | 6/2017 | Sjodin |
| 9,691,333 B2 | 6/2017 | Cheng et al. |
| 9,721,495 B2 | 8/2017 | Harrington et al. |
| 9,792,861 B2 | 10/2017 | Chang et al. |
| 9,792,862 B2 | 10/2017 | Hung et al. |
| 10,163,406 B2 | 12/2018 | Sim et al. |
| 10,229,641 B2 | 3/2019 | Yang et al. |
| 10,319,313 B2 | 6/2019 | Harris et al. |
| 10,339,876 B2 | 7/2019 | Lin et al. |
| 10,444,553 B2 | 10/2019 | Laxton |
| 10,475,396 B2 | 11/2019 | Sim et al. |
| 10,672,350 B2 | 6/2020 | Amundson et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2007/0262949 A1 | 11/2007 | Zhou |
| 2008/0024429 A1 | 1/2008 | Zehner |
| 2008/0024482 A1 | 1/2008 | Gates et al. |
| 2008/0136774 A1 | 6/2008 | Harris et al. |

(56) References Cited

U.S. PATENT DOCUMENTS

| | | |
|---|---|---|
| 2008/0303780 A1 | 12/2008 | Sprague et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0265561 A1 | 10/2010 | Gates et al. |
| 2011/0063314 A1 | 3/2011 | Chiu et al. |
| 2011/0175875 A1 | 7/2011 | Lin et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0005720 A1 | 1/2015 | Zang et al. |
| 2015/0262255 A1 | 9/2015 | Khajehnouri |
| 2016/0012710 A1 | 1/2016 | Lu et al. |
| 2016/0180777 A1 | 6/2016 | Lin et al. |
| 2016/0225321 A1* | 8/2016 | Sim .................. G09G 3/344 |
| 2018/0350309 A1* | 12/2018 | Emelie .............. G02F 1/1368 |
| 2019/0108795 A1 | 4/2019 | Auber et al. |

OTHER PUBLICATIONS

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Zafar, S. et al., "A Comparative Study of NBTI and PBTI (Charge Trapping) in SiO2/HfO2 Stacks with FUSI, TiN, Re Gates", Symposium on VLSI Technology Digest of Technical Papers, 2006.

\* cited by examiner

METHODS FOR DRIVING ELECTRO-OPTIC DISPLAYS

CROSS-REFERENCE TO RELATED APPLICATIONS

This application claims priority to U.S. Provisional Patent Application No. 63/275,515, filed Nov. 4, 2021, the entire contents of which are incorporated herein. Further, the entire contents of any patent, published application, or other published work referenced herein are incorporated by reference in their entireties.

FIELD OF THE INVENTION

This invention relates to reflective electro-optic displays and materials for use in such displays. More specifically, this invention relates to displays with reduced remnant voltage and driving methods for reducing remnant voltage in electro-optic displays.

BACKGROUND OF THE INVENTION

Electro-optics displays driven by direct current (DC) imbalanced waveforms may produce a remnant voltage, this remnant voltage being ascertainable by measuring the open-circuit electrochemical potential of a display pixel. It has been found that remnant voltage is a more general phenomenon in electrophoretic and other impulse-driven electro-optic displays, both in cause(s) and effect(s). It has also been found that DC imbalances may cause long-term lifetime degradation of some electrophoretic displays.

The term "remnant voltage" is also sometimes used as a term of convenience referring to an overall phenomenon. However, the basis for the switching behavior of impulse-driven electro-optic displays is the application of a voltage impulse (the integral of voltage with respect to time) across the electro-optic medium. Remnant voltage may reach a peak value immediately after the application of a driving pulse, and thereafter may decay substantially exponentially. The persistence of the remnant voltage for a significant time period applies a "remnant impulse" to the electro-optic medium, and strictly speaking this remnant impulse, rather than the remnant voltage, may be responsible for the effects on the optical states of electro-optic displays normally considered as caused by remnant voltage.

In theory, the effect of remnant voltage should correspond directly to remnant impulse. In practice, however, the impulse switching model can lose accuracy at low voltages.

Some electro-optic media have a threshold, such that a remnant voltage of about 1 V may not cause a noticeable change in the optical state of the medium after a drive pulse ends. However, other electro-optic media, including preferred electrophoretic media used in experiments described herein, a remnant voltage of about 0.5 V may cause a noticeable change in the optical state. Thus, two equivalent remnant impulses may differ in actual consequences, and it may be helpful to increase the threshold of the electro-optic medium to reduce the effect of remnant voltage. E Ink Corporation has produced electrophoretic media having a "small threshold" adequate to prevent remnant voltage experienced in some circumstances from immediately changing the display image after a drive pulse ends. If the threshold is inadequate or if the remnant voltage is too high, the display may present a kickback/self-erasing or self-improving phenomenon. Where the term "optical kickback" is used herein to describe a change in a pixel's optical state which occurs at least partially a response to the discharge of the pixel's remnant voltage.

Even when remnant voltages are below a small threshold, they may have a serious effect on image switching if they still persist when the next image update occurs. For example, suppose that during an image update of an electrophoretic display a +/−15 V drive voltage is applied to move the electrophoretic particles. If a +1 V remnant voltage persists from a prior update, the drive voltage would effectively be shifted from +15 V/−15 V to +16 V/−14 V. As a result, the pixel would be biased toward the dark or white state, depending on whether it has a positive or negative remnant voltage. Furthermore, this effect varies with elapsed time due to the decay rate of the remnant voltage. The electro-optic material in a pixel switched to white using a 15 V, 300 ms drive pulse immediately after a previous image update may actually experience a waveform closer to 16 V for 300 ms, whereas the material in a pixel switched to white one minute later using the exact same drive pulse (15 V, 300 ms) may actually experience a waveform closer to 15.2 V for 300 ms. Consequently the pixels may show noticeably different shades of white.

If the remnant voltage field has been created across multiple pixels by a prior image (say a dark line on a white background) then the remnant voltages may also be arrayed across the display in a similar pattern. In practical terms then, the most noticeable effect of remnant voltage on display performance may be ghosting. This problem is in addition to the problem previously noted, namely that DC imbalance (e.g. 16 V/14 V instead of 15 V/15 V) may be a cause of slow lifetime degradation of the electro-optic medium.

If a remnant voltage decays slowly and is nearly constant, then its effect in shifting the waveform does not vary from image update to update and may actually create less ghosting than a remnant voltage that decays quickly. Thus the ghosting experienced by updating one pixel after 10 minutes and another pixel after 11 minutes is much less than the ghosting experienced by updating one pixel immediately and another pixel after 1 minute. Conversely, a remnant voltage that decays so quickly that it approaches zero before the next update occurs may in practice cause no detectable ghosting.

There are multiple potential sources of remnant voltage. It is believed (although some embodiments are in no way limited by this belief), that one large cause of remnant voltage is ionic polarization within the materials of the various layers forming the display.

To summarize, remnant voltage as a phenomenon can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage.

Thus, discharging a remnant voltage of an electro-optic display may improve the quality of the displayed image, even in circumstances where the remnant voltage is already low. The inventors have recognized and appreciated that conventional techniques for discharging a remnant voltage of an electro-optic display may not fully discharge the remnant voltage. That is, conventional techniques of discharging the remnant voltage may result in the electro-optic display retaining at least a low remnant voltage. Thus, techniques for better discharging remnant voltages from electro-optic displays are needed.

SUMMARY OF THE INVENTION

The invention provides a method for driving a display pixel of an electro-optic display, the method include applying a negative bias voltage to the gate-source of a pixel transistor to induce leakage conduction on the transistor, thereby creating a conduction path for draining remnant voltages.

In one aspect, the invention features an electro-optic display including an electrophoretic display medium electrically coupled between a common electrode and a display pixel electrode associated with a display pixel. The electro-optic display also includes a display controller circuit in electrical communication with the common electrode and an n-type transistor associated with the display pixel electrode. The display controller circuit is capable of applying waveforms to the display pixel by applying one or more time-dependent voltages between the common electrode and the display pixel electrode, where the one or more time-dependent voltages are applied to the display pixel electrode via the n-type transistor. The display controller circuit is configured to apply one or more waveforms to the display pixel to drive the electrophoretic display medium in proximity to the display pixel to a first optical state, and maintain the display pixel in the first optical state for a hold period. The display controller circuit is also configured to place the display pixel in a floating state, and apply substantially zero volts to the common electrode and the display pixel electrode. The display controller circuit is also configured to apply a low gate voltage rail voltage to a gate electrode of the n-type transistor, where the low gate voltage rail voltage is a negative voltage of sufficient magnitude to induce a leakage conduction path within the n-type transistor for discharging a remnant voltage from the electrophoretic display medium, and the low gate voltage rail voltage has a larger magnitude than a gate off voltage of the n-type transistor.

In some embodiments, the electro-optic display includes an active matrix of display pixels, and the display pixel is one of the display pixels of the active matrix of display pixels. In some embodiments, the one or more waveforms are each made up of one or more frames. In some embodiments, the hold period is made up of one or more frames.

In some embodiments, the leakage conduction path is formed between a drain electrode of the n-type transistor and a source electrode of the n-type transistor.

In some embodiments, placing the first display pixel in a floating state includes applying a gate off voltage to a gate electrode of the n-type transistor, where the gate off voltage is a negative voltage sufficient to prevent formation of a conduction path through a drain electrode of the n-type transistor and a source electrode of the n-type transistor. In some embodiments, placing the first display pixel in a floating state includes disconnecting an electrical connection between the common electrode and a voltage source.

In some embodiments, maintaining the display pixel in the first optical state for the hold period includes applying a substantially equal voltage to the common electrode and the display pixel electrode, and applying a gate on voltage to a gate electrode of the n-type transistor, where the gate on voltage is a positive voltage sufficient to create a conduction path through the n-type transistor.

In another aspect, the invention features a method for driving an electro-optic display including an electrophoretic display medium electrically coupled between a common electrode and a display pixel. The display pixel is associated with a display pixel electrode and an n-type transistor electrically coupled to a display controller circuit capable of applying waveforms to the display pixel by applying one or more time-dependent voltages between the common electrode and the display pixel electrode via the n-type transistor, where the one or more time-dependent voltages are applied to the display pixel electrode. The method includes the following steps in order: (1) applying one or more waveforms to the display pixel to drive the electrophoretic display medium in proximity to the display pixel to a first optical state, (2) maintaining the display pixel in the first optical state for a hold period, (3) placing the display pixel in a floating state, (4) applying substantially zero volts to the common electrode and the display pixel electrode, and (5) applying a low gate voltage rail voltage to a gate electrode of the n-type transistor, where the low gate voltage rail voltage is a negative voltage of sufficient magnitude to induce a leakage conduction path within the n-type transistor for discharging a remnant voltage from the electrophoretic display medium, and where the low gate voltage rail voltage has a larger magnitude than a gate off voltage of the n-type transistor.

In some embodiments, the method includes an active matrix of display pixels, wherein the display pixel is one of the display pixels of the active matrix of display pixels. In some embodiments, the one or more waveforms each comprise one or more frames. In some embodiments, the hold period includes one or more frames. In some embodiments, the leakage conduction path is formed between a drain electrode of the n-type transistor and a source electrode of the n-type transistor.

In some embodiments, placing the first display pixel in a floating state includes applying a gate off voltage to a gate electrode of the n-type transistor, where the gate off voltage is a negative voltage sufficient to prevent formation of a conduction path through a drain electrode of the n-type transistor and a source electrode of the n-type transistor. In some embodiments, placing the first display pixel in a floating state includes disconnecting an electrical connection between the common electrode and a voltage source.

In some embodiments, maintaining the display pixel in the first optical state for the hold period includes applying a substantially equal voltage to the common electrode and the display pixel electrode, and applying a gate on voltage to a gate electrode of the n-type transistor, where the gate on voltage is a positive voltage sufficient to create a conduction path through the n-type transistor.

In another aspect, the invention features an electro-optic display including an electrophoretic display medium electrically coupled between a common electrode and a display pixel electrode associated with a display pixel. The electro-optic display also includes a display controller circuit in electrical communication with the common electrode and an n-type transistor associated with the display pixel electrode. The display controller circuit is capable of applying waveforms to the display pixel by applying one or more time-dependent voltages between the common electrode and the display pixel electrode via the n-type transistor, where the one or more time-dependent voltages are applied to the display pixel electrode. The display controller circuit configured is to apply one or more waveforms to the display pixel to drive the electrophoretic display medium in proximity to the display pixel to a first optical state. The display controller circuit is also configured to apply substantially zero volts to the common electrode and the display pixel electrode, and apply a low gate voltage rail voltage to a gate electrode of the n-type transistor, where the low gate voltage rail voltage is a negative voltage of sufficient magnitude to induce a leakage conduction path within the n-type transistor for discharging a remnant voltage from the electrophoretic display medium, and where the low gate voltage rail voltage has a larger magnitude than a gate off voltage of the n-type transistor.

In some embodiments, the electro-optic display includes an active matrix of display pixels, where the display pixel is one of the display pixels of the active matrix of display pixels. In some embodiments, the one or more waveforms each include one or more frames. In some embodiments, the hold period includes one or more frames.

In some embodiments, the leakage conduction path is formed between a drain electrode of the n-type transistor and a source electrode of the n-type transistor.

In another aspect, the invention features a method for driving an electro-optic display including an electrophoretic display medium electrically coupled between a common electrode and a display pixel. The display pixel is associated with a display pixel electrode and an n-type transistor electrically coupled to a display controller circuit capable of applying waveforms to the display pixel by applying one or more time-dependent voltages between the common electrode and the display pixel electrode via the n-type transistor, where the one or more time-dependent voltages are applied to the display pixel electrode. The method includes the following steps in order (1) applying one or more waveforms to the display pixel to drive the electrophoretic display medium in proximity to the display pixel to a first optical state, (2) applying substantially zero volts to the common electrode and the display pixel electrode, and (3) applying a low gate voltage rail voltage to a gate electrode of the n-type transistor, where the low gate voltage rail voltage is a negative voltage of sufficient magnitude to induce a leakage conduction path within the n-type transistor for discharging a remnant voltage from the electrophoretic display medium, and where the low gate voltage rail voltage has a larger magnitude than a gate off voltage of the n-type transistor.

In some embodiments, the electro-optic display includes an active matrix of display pixels, where the display pixel is one of the display pixels of the active matrix of display pixels.

In some embodiments, the one or more waveforms each include one or more frames. In some embodiments, the hold period is made up of one or more frames. In some embodiments, the leakage conduction path is formed between a drain electrode of the n-type transistor and a source electrode of the n-type transistor.

DETAILED DESCRIPTION OF THE INVENTION

Figure 1:
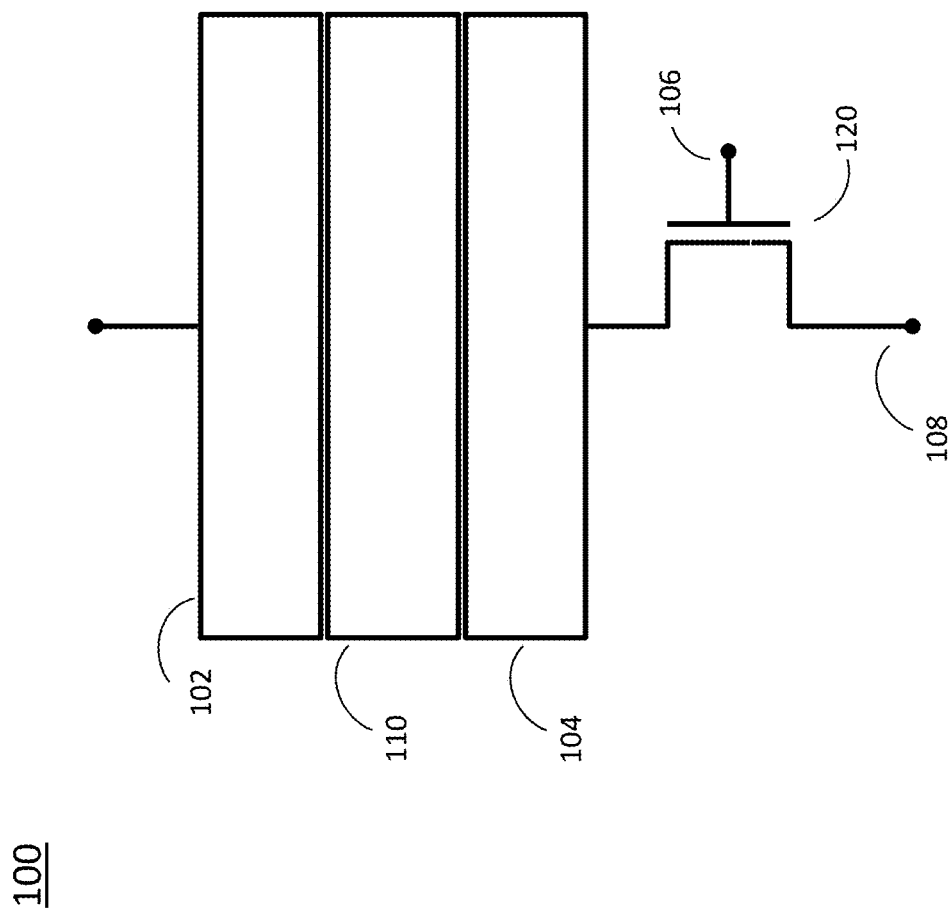
FIG. 1 is a circuit diagram representing an electrophoretic display in accordance with the subject matter disclosed herein.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a drive scheme which only drives pixels to their two extreme optical states with no intervening gray states.

Much of the discussion below will focus on methods for driving one or more pixels of an electro-optic display through a transition from an initial gray level to a final gray level (which may or may not be different from the initial gray level). The term "waveform" will be used to denote the entire voltage against time curve used to effect the transition from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, the aforementioned U. S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes." It is also possible, as described in several of the aforementioned MEDEOD applications, to use more than one drive scheme simultaneously in different areas of the same display, and a set of drive schemes used in this manner may be referred to as "a set of simultaneous drive schemes."

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564.

(h) Applications of displays; see for example U.S. Pat. Nos. 7,312,784; 8,009,348;

(i) Non-electrophoretic displays, as described in U.S. Pat. Nos. 6,241,921 and U.S. Patent Application Publication No. 2015/0277160; and applications of encapsulation and microcell technology other than displays; see for example U.S. Patent Application Publications Nos. 2015/0005720 and 2016/0012710; and Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/

0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display." In a microcell electrophoretic display, the charged particles and the suspending fluid are not encapsulated within microcapsules but instead are retained within a plurality of cavities formed within a carrier medium, e.g., a polymeric film. See, for example, International Application Publication No. WO 02/01281, and published U.S. Application No. 2002/0075556, both assigned to Sipix Imaging, Inc.

Many of the aforementioned E Ink and MIT patents and applications also contemplate microcell electrophoretic displays and polymer-dispersed electrophoretic displays. The term "encapsulated electrophoretic displays" can refer to all such display types, which may also be described collectively as "microcavity electrophoretic displays" to generalize across the morphology of the walls.

Another type of electro-optic display is an electro-wetting display developed by Philips and described in Hayes, R. A., et al., "Video-Speed Electronic Paper Based on Electrowetting," Nature, 425, 383-385 (2003). It is shown in copending application Ser. No. 10/711,802, filed Oct. 6, 2004, that such electro-wetting displays can be made bistable.

Other types of electro-optic materials may also be used. Of particular interest, bistable ferroelectric liquid crystal displays (FLCs) are known in the art and have exhibited remnant voltage behavior.

Although electrophoretic media may be opaque (since, for example, in many electrophoretic media, the particles substantially block transmission of visible light through the display) and operate in a reflective mode, some electrophoretic displays can be made to operate in a so-called "shutter mode" in which one display state is substantially opaque and one is light-transmissive. See, for example, the patents U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

A high-resolution display may include individual pixels which are addressable without interference from adjacent pixels. One way to obtain such pixels is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. When the non-linear element is a transistor, the pixel electrode may be connected to the drain of the transistor, and this arrangement will be assumed in the following description, although it is essentially arbitrary and the pixel electrode could be connected to the source of the transistor. In high-resolution arrays, the pixels may be arranged in a two-dimensional array of rows and columns, such that any specific pixel is uniquely defined by the intersection of one specified row and one specified column. The sources of all the transistors in each column may be connected to a single column electrode, while the gates of all the transistors in each row may be connected to a single row electrode; again the assignment of sources to rows and gates to columns may be reversed if desired.

The display may be written in a row-by-row manner. The row electrodes are connected to a row driver, which may apply to a selected row electrode a voltage such as to ensure that all the transistors in the selected row are conductive, while applying to all other rows a voltage such as to ensure that all the transistors in these non-selected rows remain non-conductive. The column electrodes are connected to column drivers, which place upon the various column electrodes voltages selected to drive the pixels in a selected row to their desired optical states. (The aforementioned voltages are relative to a common front electrode which may be provided on the opposed side of the electro-optic medium from the non-linear array and extends across the whole display. As in known in the art, voltage is relative and a measure of a charge differential between two points. One voltage value is relative to another voltage value. For example, zero voltage ("0V") refers to having no voltage differential relative to another voltage.) After a pre-selected interval known as the "line address time," a selected row is deselected, another row is selected, and the voltages on the column drivers are changed so that the next line of the display is written.

However, in use, certain waveforms may produce a remnant voltage to pixels of an electro-optic display, and as evident from the discussion above, this remnant voltage produces several unwanted optical effects and is in general undesirable.

As presented herein, a "shift" in the optical state associated with an addressing pulse refers to a situation in which a first application of a particular addressing pulse to an electro-optic display results in a first optical state (e.g., a first gray tone), and a subsequent application of the same addressing pulse to the electro-optic display results in a second optical state (e.g., a second gray tone). Remnant voltages may give rise to shifts in the optical state because the voltage applied to a pixel of the electro-optic display during application of an addressing pulse includes the sum of the remnant voltage and the voltage of the addressing pulse.

A "drift" in the optical state of a display over time refers to a situation in which the optical state of an electro-optic display changes while the display is at rest (e.g., during a period in which an addressing pulse is not applied to the display). Remnant voltages may give rise to drifts in the optical state because the optical state of a pixel may depend on the pixel's remnant voltage, and a pixel's remnant voltage may decay over time.

As discussed above, "ghosting" refers to a situation in which, after the electro-optic display has been rewritten, traces of the previous image(s) are still visible. Remnant voltages may give rise to "edge ghosting," a type of ghosting in which an outline (edge) of a portion of a previous image remains visible.

Where the term "optical kickback" is used herein to describe a change in a pixel's optical state which occurs at least partially response to the discharge of the pixel's remnant voltage.

FIG. 1 shows a schematic of a pixel 100 of an electro-optic display in accordance with the subject matter submitted herein. Pixel 100 may include an imaging film 110. In some embodiments, imaging film 110 may be bistable. In some embodiments, imaging film 110 may include, without limitation, an encapsulated electrophoretic imaging film, which may include, for example, charged pigment particles.

Imaging film 110 may be disposed between a front electrode 102 and a rear electrode 104. Front electrode 102 may be formed between the imaging film and the front of the display. In some embodiments, front electrode 102 may be transparent. In some embodiments, front electrode 102 may be formed of any suitable transparent material, including, without limitation, indium tin oxide (ITO). Rear electrode 104 may be formed opposite a front electrode 102. In some embodiments, a parasitic capacitance (not shown) may be formed between front electrode 102 and rear electrode 104.

Pixel 100 may be one of a plurality of pixels. The plurality of pixels may be arranged in a two-dimensional array of rows and columns to form a matrix, such that any specific pixel is uniquely defined by the intersection of one specified row and one specified column. In some embodiments, the matrix of pixels may be an "active matrix," in which each pixel is associated with at least one non-linear circuit element 120. The non-linear circuit element 120 may be coupled between back-plate electrode 104 and an addressing electrode 108. In some embodiments, non-linear element 120 may include a diode and/or a transistor, including, without limitation, a MOSFET. The drain (or source) of the MOSFET may be coupled to back-plate electrode 104, the source (or drain) of the MOSFET may be coupled to addressing electrode 108, and the gate 106 of the MOSFET may be coupled to a driver and configured to control the activation and deactivation of the MOSFET. (For simplicity, the terminal of the MOSFET coupled to back-plate electrode 104 will be referred to as the MOSFET's drain, and the terminal of the MOSFET coupled to addressing electrode 108 will be referred to as the MOSFET's source. However, one of ordinary skill in the art will recognize that, in some embodiments, the source and drain of the MOSFET may be interchanged.)

In some embodiments of the active matrix, the addressing electrodes 108 of all the pixels in each column may be connected to a same column electrode, and the gate 106 of all the transistors coupled to all the pixels in each row may be connected to a same row electrode. The row electrodes may be connected to a row driver, which may select one or more rows of pixels by applying to the selected row electrodes a voltage sufficient to activate the non-linear elements 120 of all the pixels 100 in the selected row(s). The column electrodes may be connected to column drivers, which may place upon the transistor gate 106 of a selected (activated) pixel a voltage suitable for driving the pixel into a desired optical state. The voltage applied to an addressing electrode 108 may be relative to the voltage applied to the pixel's front-plate electrode 102 (e.g., a voltage of approximately zero volts). In some embodiments, the front-plate electrodes 102 of all the pixels in the active matrix may be coupled to a common electrode.

In some embodiments, the pixels 100 of the active matrix may be written in a row-by-row manner. For example, a row of pixels may be selected by the row driver, and the voltages corresponding to the desired optical states for the row of pixels may be applied to the pixels by the column drivers. After a pre-selected interval known as the "line address time," the selected row may be deselected, another row may be selected, and the voltages on the column drivers may be changed so that another line of the display is written.

Electro-optic displays can receive power from external electronics, such as a display controller and supply voltages from "power management" circuitry. The power management circuitry may supply multiple voltages, including "gate on voltage" supplied to gate lines (also referred to herein as "select lines") to bring transistors on selected lines into conduction. The power management circuitry may be discrete components or an integrated circuit (e.g., Power Management Integrated Circuit ("PMIC")). Additional circuitry may include pulldown resistor(s) and/or pulldown capacitor(s).

Electro-optic displays can include display controller circuitry including power management circuitry for applying voltage waveforms to the display pixels sufficient to change the optical state of the electrophoretic display medium in proximity to the display pixels. One of skill in the art will appreciate that the display controller circuitry of the present invention can be implemented in a number of different physical forms and can utilize a variety of analog and digital components. For example, the display controller circuitry can include a general purpose microprocessor in conjunction with appropriate peripheral components (for example, one or more digital-to-analog converters, "DACs") to convert the digital outputs from the microprocessor to appropriate voltages for application to pixels. Alternatively, the display controller circuitry can be implemented in an application specific integrated circuit ("ASIC") or field programmable gate array ("FPGA"). One of skill in the art will appreciate that the display controller circuitry can include both processing components and power management circuitry such as the PMIC described above.

In some embodiments, the display controller circuitry includes a timing controller integrated circuit ("IC") that accepts incoming image data and outputs control signals to a collection of data and select driver ICs in order to produce the proper voltages at the pixels to display the desired image. In some embodiments, a host controller in communication with the display controller circuit requests an update to the display and supplies the image data for the update to the display controller circuit. In some embodiments, the display controller circuitry accepts the image data through access to a memory buffer that contains the image data, or receives a signal from which the image data is extracted. In some embodiments, the memory buffer has a structure such as those described in the afore-referenced U.S. Pat. No. 9,721, 495. In some embodiments, the display controller circuitry receives serial signals containing the information required to perform the necessary calculations to generate drive impulses (e.g., driving waveforms) to apply to the electro-phoretic medium during scans of the pixel array.

Figure 2:
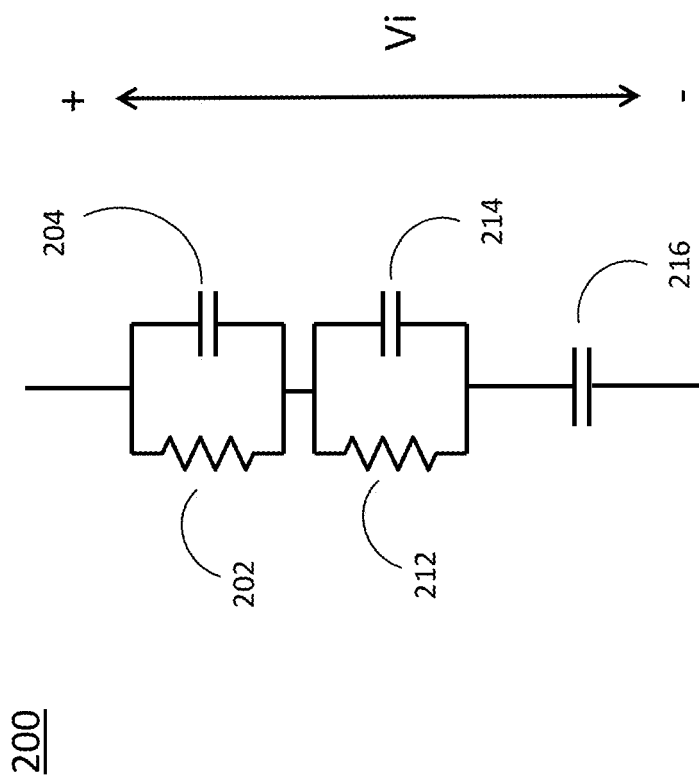
FIG. 2 shows a circuit model of the electro-optic imaging layer in accordance with the subject matter disclosed herein.

FIG. 2 shows a circuit model of the electro-optic imaging layer 110 disposed between the front electrode 102 and the rear electrode 104 in accordance with the subject matter presented herein. Resistor 202 and capacitor 204 may represent the resistance and capacitance of the electro-optic imaging layer 110, the front electrode 102 and the rear electrode 104, including any adhesive layers. Resistor 212 and capacitor 214 may represent the resistance and capacitance of a lamination adhesive layer. Capacitor 216 may represent a capacitance that may form between the front electrode 102 and the back electrode 104, for example, interfacial contact areas between layers, such as the interface between the imaging layer and the lamination adhesive layer and/or between the lamination adhesive layer and the backplane electrode. A voltage Vi across a pixel's imaging film 110 may include the pixel's remnant voltage.

Figure 3:
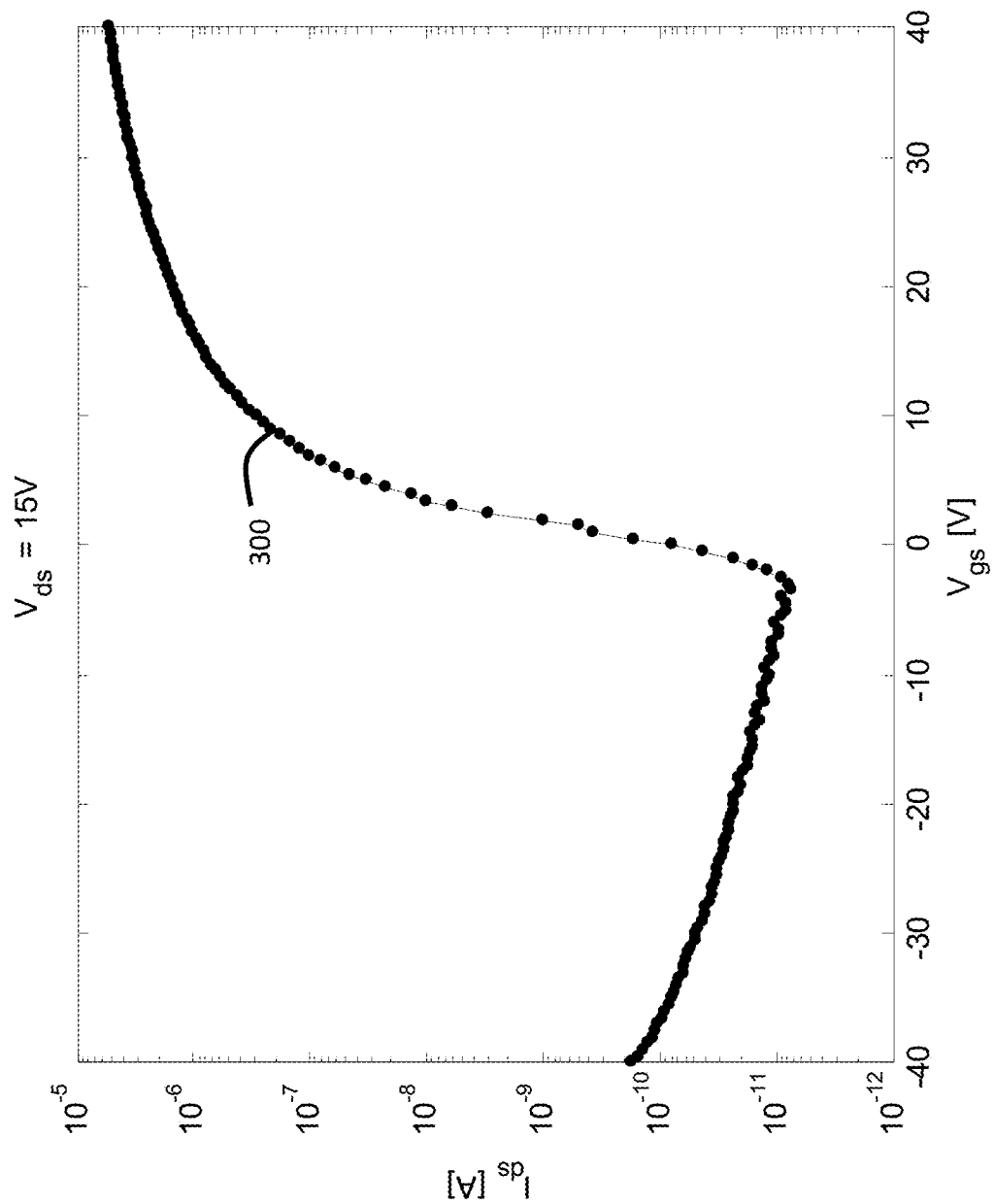
FIG. 3 illustrates a conduction map of a transistor in response to applied gate voltages.

In some embodiments, the discharge of the remnant voltage may be achieved by utilizing the leakage conduction effect of the transistors associated with each display pixels. For example, referring now to plot 300 of FIG. 3, transistor leakage current is shown here as increasing drain-to-source current or Ids as the voltage bias across the transistor gate-to-sources, or Vgs, becomes increasingly negative. In practice, as Vgs becomes increasingly negative, the transistor becomes conductive, and this conduction can be used to drain the remnant voltages from the display pixels and as well as the display.

In use, the discharge of the remnant voltage of a pixel using the leakage conduction effect of pixel transistors may be initiated and/or controlled by applying any suitable set of signals to a pixel, including, without limitation, a set of signals illustrated in more details below in FIGS. 4 and 5.

Figure 4:
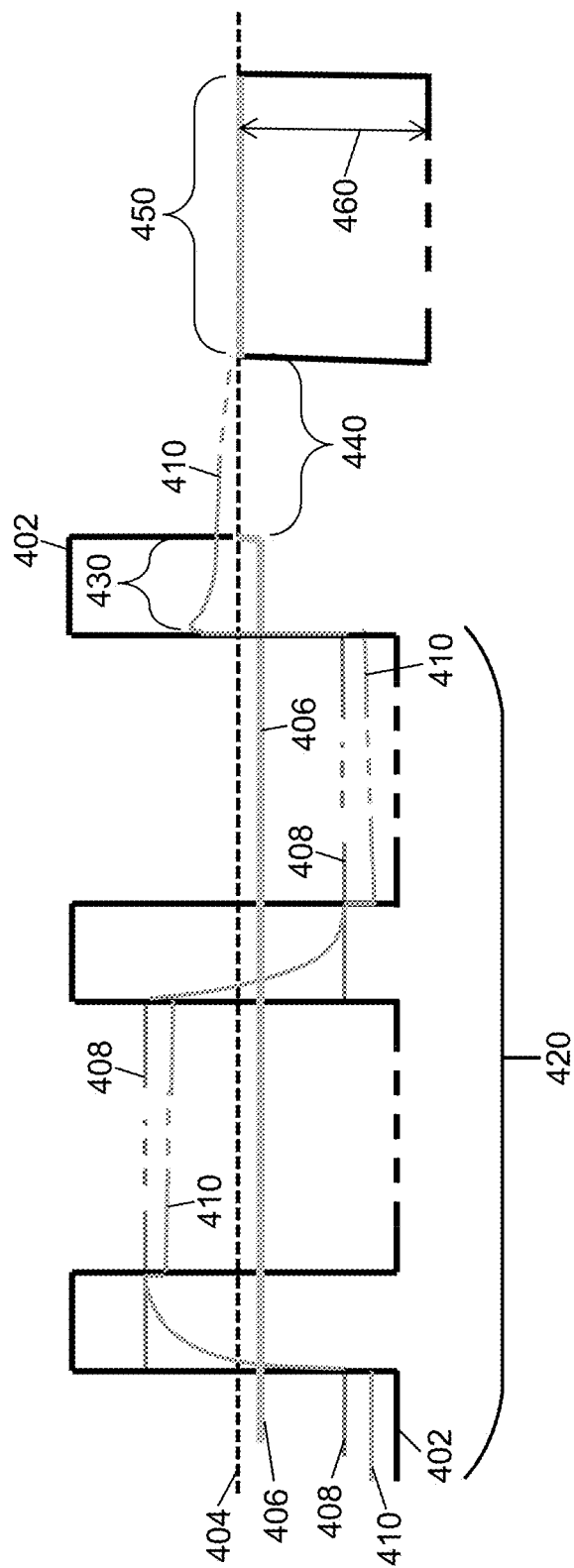
FIG. 4 illustrates one embodiment of a driving sequence in accordance with the subject matter disclosed herein.

FIG. 4 illustrates one embodiment of a driving pulse configuration for driving a single display pixel with an n-type field effect transistor and a storage capacitor in accordance with the subject matter disclosed herein. The example of FIG. 4 shows gate voltage 402 (e.g., the voltage applied to the gate of the pixel transistor), reference voltage 404 (e.g., zero volts), common voltage 406 (commonly referred to as VcoM) which is a voltage applied to the front electrode 102 (FIG. 1), source voltage 408, and voltage Vi 410 is the voltage experienced by the electro-optic layer.

As shown in FIG. 4, one or more waveforms are applied to the display pixel during addressing phase 420 to drive the electrophoretic display medium in proximity to the display pixel to a desired optical state. A hold period 430 lasting for a duration of one or more frames follows addressing phase 420. During hold period 430, a substantially equal voltage is applied to common voltage 406 and the display pixel electrode via source voltage 408, while a gate on voltage is applied to the gate electrode of the n-type transistor via gate voltage 402. The gate on voltage is a positive voltage sufficient to create a conduction path through the n-type transistor. In some embodiments, hold period 430 is a part of addressing phase 420.

After the hold period 430, the gate voltage 402 is set to zero volts, placing the display pixel in a floating dwell state 440. In some embodiments, placing the display pixel in a floating dwell state 440 includes applying a gate off voltage to the gate electrode of the n-type transistor via gate voltage 402. The gate off voltage can be a negative voltage sufficient to prevent formation of a conduction path through a drain electrode of the n-type transistor and a source electrode of the n-type transistor. In some embodiments, placing the display pixel in a floating dwell state 440 includes disconnecting an electrical connection between the common electrode and a voltage source that supplies common voltage 406.

Subsequent to the floating dwell state 440, the display pixel enters a discharge state 450. During discharge state 450 a low gate voltage rail voltage 460 (also referred to as $V_{EEd}$ 460) may be applied to the gate electrode of the n-type transistor via gate voltage 402. Voltage $V_{EEd}$ 460 is of sufficient magnitude to induce a leakage conduction path within the n-type transistor for discharging a remnant voltage from the electrophoretic display medium. In some embodiments, the low gate voltage rail voltage has a larger magnitude than the gate off voltage of the n-type transistor. At the conclusion of the draining of the remnant voltages, the gate voltage 402 can return to zero volts.

Figure 5:
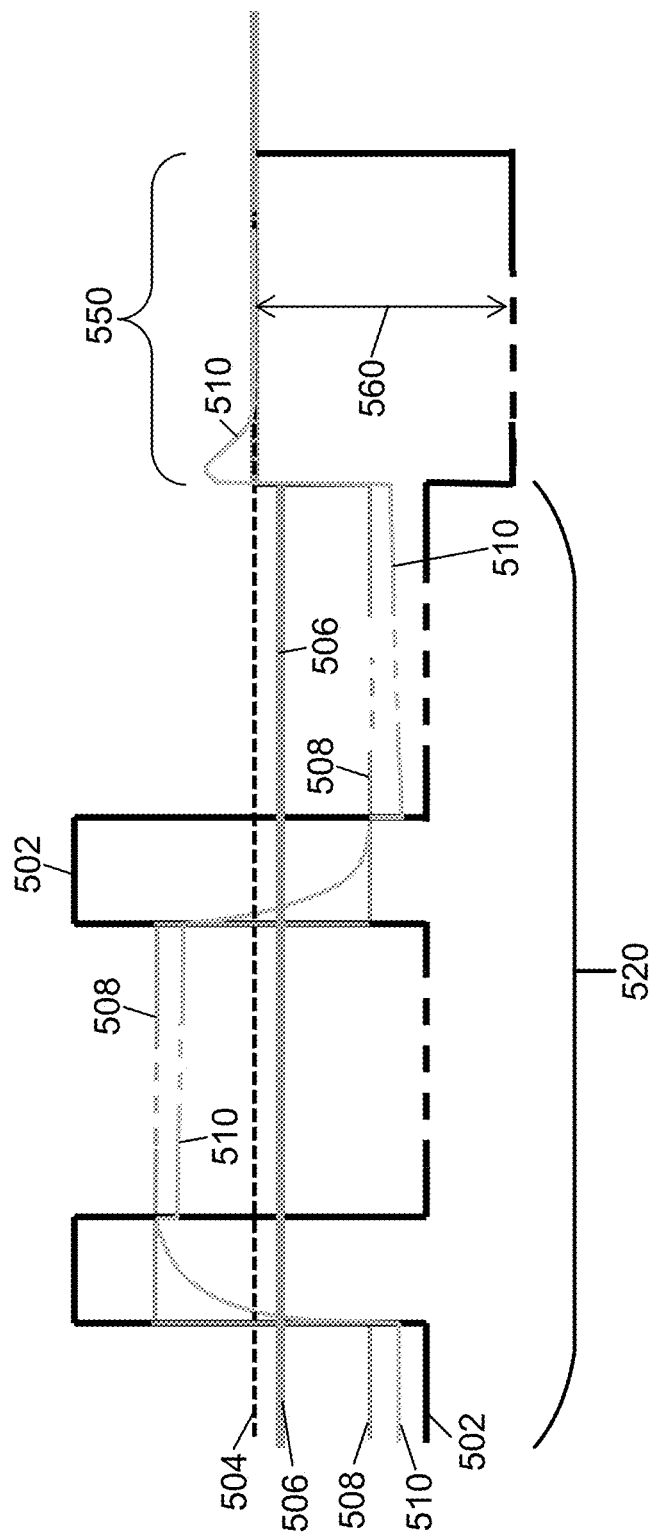
FIG. 5 illustrates another embodiment of a driving sequence in accordance with the subject matter disclosed herein.

Alternatively, referring now to FIG. 5, the low gate voltage rail voltage $V_{EEd}$ 560 may be applied to the gate electrode of the n-type transistor via gate voltage 502 to put the display pixel into discharge state 550 directly at the end of addressing phase 520 without any intervening hold period or floating dwell state.

Figure 6:
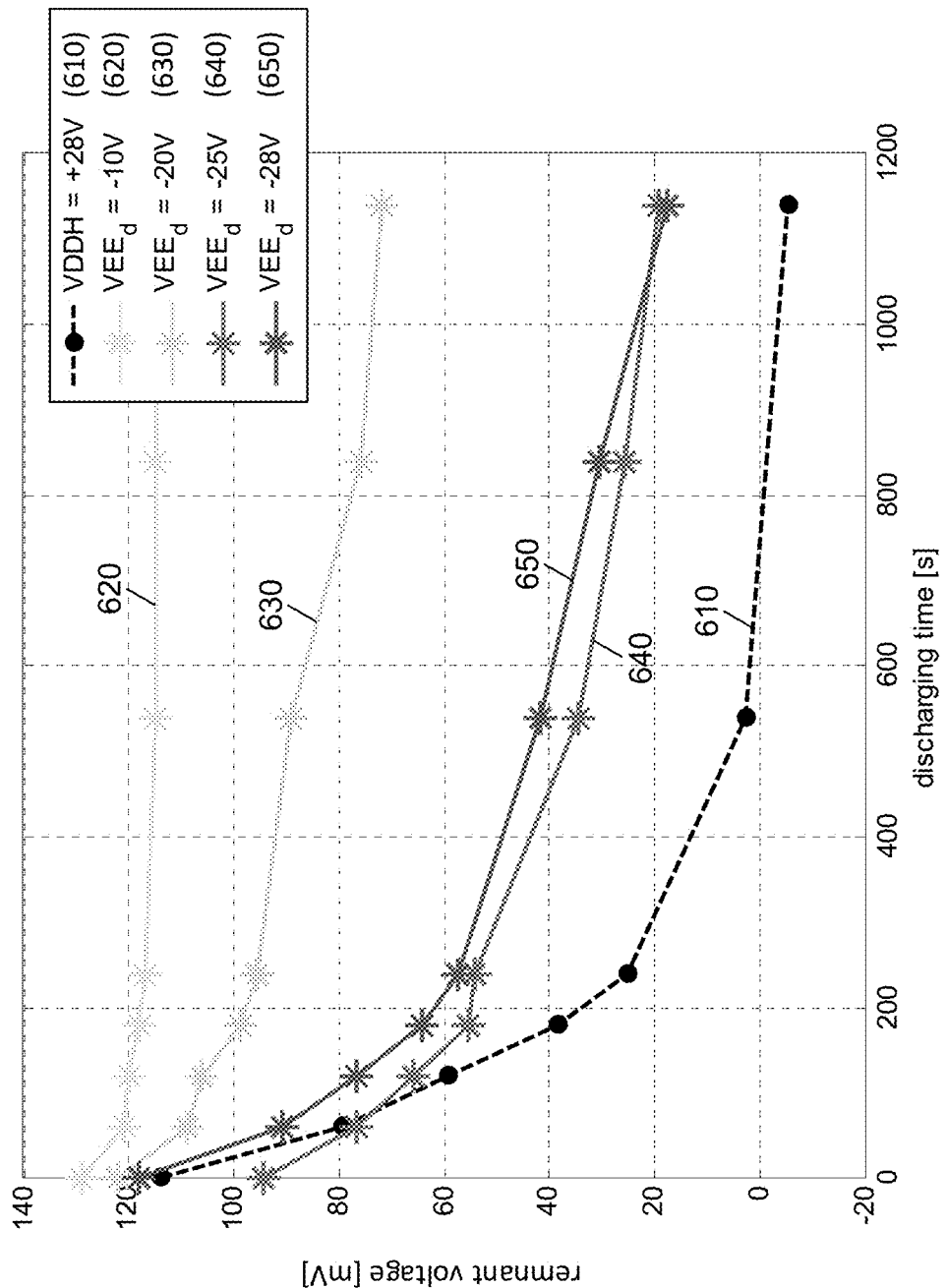
FIG. 6 illustrates a comparison of remnant voltage discharge efficacy using different gate voltages.

FIG. 6 illustrates remnant voltage discharging efficacy with different levels of $V_{EEd}$ ($V_{EEd}$=-10V (620), $V_{EEd}$=-20V (630), $V_{EEd}$=-25V (640), $V_{EEd}$=-28V (650)), in comparison to setting the gate voltage to a +28 volts level (VDDH=+28V (610)), as is done for conventional techniques. As shown, comparable discharging is achievable using the leakage conduction effect compared to that of positive gate voltages. In addition, with this amount of leakage conduction, the display can still be used for normal or standard update operations.

Furthermore, using the driving sequences presented in FIG. 4 and FIG. 5, a specialized circuit for providing high gate voltages to the pixel transistor to mitigate transistor performance instability is no longer needed, and no more additional positive stress bias is introduced to the transistors due to the draining of the remnant voltage using a positive gate voltage, as in conventional techniques.

Accordingly, the techniques disclosed herein provide a simpler method of discharging remnant voltage than conventional techniques. Furthermore, since the techniques described herein discharge remnant voltage during periods separate from the addressing phase, the display pixels can be driven using DC imbalanced waveforms which are typically shorter in duration than DC balanced waveforms. This enhances the user experience by reducing the overall update time of the display.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. An electro-optic display comprising:
   an electrophoretic display medium electrically coupled between a common electrode and a display pixel electrode associated with a display pixel;
   a display controller circuit in electrical communication with the common electrode and an n-type transistor associated with the display pixel electrode, the display controller circuit capable of applying waveforms to the display pixel by applying one or more time-dependent voltages between the common electrode and the display pixel electrode, wherein the one or more time-dependent voltages are applied to the display pixel electrode via the n-type transistor, the display controller circuit configured to:
apply one or more waveforms to the display pixel to drive the electrophoretic display medium in proximity to the display pixel to a first optical state;
maintain the display pixel in the first optical state for a hold period;
place the display pixel in a floating state;
apply substantially zero volts to the common electrode and the display pixel electrode; and
apply a low gate voltage rail voltage to a gate electrode of the n-type transistor, wherein the low gate voltage rail voltage is a negative voltage of sufficient magnitude to induce a leakage conduction path within the n-type transistor for discharging a remnant voltage from the electrophoretic display medium, and wherein the low gate voltage rail voltage has a larger magnitude than a gate off voltage of the n-type transistor.

2. The electro-optic display of claim 1 further comprising an active matrix of display pixels, wherein the display pixel is one of the display pixels of the active matrix of display pixels.

3. The electro-optic display of claim 2 wherein the one or more waveforms each comprise one or more frames.

4. The electro-optic display of claim 3 wherein the hold period comprises one or more frames.

5. The electro-optic display of claim 1 wherein the leakage conduction path is formed between a drain electrode of the n-type transistor and a source electrode of the n-type transistor.

6. The electro-optic display of claim 1 wherein placing the first display pixel in the floating state comprises applying the gate off voltage to the gate electrode of the n-type transistor, wherein the gate off voltage is a negative voltage sufficient to prevent formation of a conduction path through a drain electrode of the n-type transistor and a source electrode of the n-type transistor.

7. The electro-optic display of claim 1 wherein placing the first display pixel in the floating state comprises disconnecting an electrical connection between the common electrode and a voltage source.

8. The electro-optic display of claim 1 wherein maintaining the display pixel in the first optical state for the hold period comprises:
applying a substantially equal voltage to the common electrode and the display pixel electrode; and
applying a gate on voltage to the gate electrode of the n-type transistor, wherein the gate on voltage is a positive voltage sufficient to create a conduction path through the n-type transistor.

9. A method for driving an electro-optic display comprising an electrophoretic display medium electrically coupled between a common electrode and a display pixel, the display pixel associated with a display pixel electrode and an n-type transistor electrically coupled to a display controller circuit capable of applying waveforms to the display pixel by applying one or more time-dependent voltages between the common electrode and the display pixel electrode via the n-type transistor, wherein the one or more time-dependent voltages are applied to the display pixel electrode, the method comprising the following steps in order:
applying one or more waveforms to the display pixel to drive the electrophoretic display medium in proximity to the display pixel to a first optical state;
maintaining the display pixel in the first optical state for a hold period;
placing the display pixel in a floating state;
applying substantially zero volts to the common electrode and the display pixel electrode; and
applying a low gate voltage rail voltage to a gate electrode of the n-type transistor, wherein the low gate voltage rail voltage is a negative voltage of sufficient magnitude to induce a leakage conduction path within the n-type transistor for discharging a remnant voltage from the electrophoretic display medium, and wherein the low gate voltage rail voltage has a larger magnitude than a gate off voltage of the n-type transistor.

10. The method of claim 9 further comprising an active matrix of display pixels, wherein the display pixel is one of the display pixels of the active matrix of display pixels.

11. The method of claim 10 wherein the one or more waveforms each comprise one or more frames.

12. The method of claim 11 wherein the hold period comprises one or more frames.

13. The method of claim 9 wherein the leakage conduction path is formed between a drain electrode of the n-type transistor and a source electrode of the n-type transistor.

14. The method of claim 9 wherein placing the first display pixel in the floating state comprises applying the gate off voltage to the gate electrode of the n-type transistor, wherein the gate off voltage is a negative voltage sufficient to prevent formation of a conduction path through a drain electrode of the n-type transistor and a source electrode of the n-type transistor.

15. The method of claim 9 wherein placing the first display pixel in the floating state comprises disconnecting an electrical connection between the common electrode and a voltage source.

16. The method of claim 9 wherein maintaining the display pixel in the first optical state for the hold period comprises:
applying a substantially equal voltage to the common electrode and the display pixel electrode; and
applying a gate on voltage to the gate electrode of the n-type transistor, wherein the gate on voltage is a positive voltage sufficient to create a conduction path through the n-type transistor.

17. An electro-optic display comprising:
an electrophoretic display medium electrically coupled between a common electrode and a display pixel electrode associated with a display pixel;
a display controller circuit in electrical communication with the common electrode and an n-type transistor associated with the display pixel electrode, the display controller circuit capable of applying waveforms to the display pixel by applying one or more time-dependent voltages between the common electrode and the display pixel electrode via the n-type transistor, wherein the one or more time-dependent voltages are applied to the display pixel electrode, the display controller circuit configured to:
apply one or more waveforms to the display pixel to drive the electrophoretic display medium in proximity to the display pixel to a first optical state;
apply substantially zero volts to the common electrode and the display pixel electrode; and
apply a low gate voltage rail voltage to a gate electrode of the n-type transistor, wherein the low gate voltage rail voltage is a negative voltage of sufficient magnitude to induce a leakage conduction path within the n-type transistor for discharging a remnant voltage from the electrophoretic display medium, and wherein the low gate voltage rail voltage has a larger magnitude than a gate off voltage of the n-type transistor.

18. The electro-optic display of claim 17 further comprising an active matrix of display pixels, wherein the display pixel is one of the display pixels of the active matrix of display pixels.

19. The electro-optic display of claim 18 wherein the one or more waveforms each comprise one or more frames.

20. The electro-optic display of claim 19 wherein the hold period comprises one or more frames.

21. The electro-optic display of claim 17 wherein the leakage conduction path is formed between a drain electrode of the n-type transistor and a source electrode of the n-type transistor.

22. A method for driving an electro-optic display comprising an electrophoretic display medium electrically coupled between a common electrode and a display pixel, the display pixel associated with a display pixel electrode and an n-type transistor electrically coupled to a display controller circuit capable of applying waveforms to the display pixel by applying one or more time-dependent voltages between the common electrode and the display pixel electrode via the n-type transistor, wherein the one or more time-dependent voltages are applied to the display pixel electrode, the method comprising the following steps in order:
- applying one or more waveforms to the display pixel to drive the electrophoretic display medium in proximity to the display pixel to a first optical state;
- applying substantially zero volts to the common electrode and the display pixel electrode; and
- applying a low gate voltage rail voltage to a gate electrode of the n-type transistor, wherein the low gate voltage rail voltage is a negative voltage of sufficient magnitude to induce a leakage conduction path within the n-type transistor for discharging a remnant voltage from the electrophoretic display medium, and wherein the low gate voltage rail voltage has a larger magnitude than a gate off voltage of the n-type transistor.

23. The method of claim 22 further comprising an active matrix of display pixels, wherein the display pixel is one of the display pixels of the active matrix of display pixels.

24. The method of claim 23 wherein the one or more waveforms each comprise one or more frames.

25. The method of claim 24 wherein the hold period comprises one or more frames.

26. The method of claim 22 wherein the leakage conduction path is formed between a drain electrode of the n-type transistor and a source electrode of the n-type transistor.

* * * * *